(12) United States Patent
Genova et al.

(10) Patent No.: US 6,534,937 B2
(45) Date of Patent: Mar. 18, 2003

(54) CONTROL METHOD OF THE CURRENT FLOW IN DRIVER SYSTEMS FOR BRUSHLESS MOTORS, PARTICULARLY DURING THE SWITCHING PHASE

(75) Inventors: Angelo Genova, Delia (IT); Albino Pidutti, Udine (IT); Aldo Novelli, S. Lorenzo Parabiago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/823,916

(22) Filed: Mar. 30, 2001

(65) Prior Publication Data

US 2001/0048284 A1 Dec. 6, 2001

(30) Foreign Application Priority Data

Mar. 31, 2000 (EP) .............................. 00830247

(51) Int. Cl.[7] ................................. H02P 7/06
(52) U.S. Cl. ................. 318/254; 318/439; 318/138; 318/432
(58) Field of Search ................. 318/138, 254, 318/439, 432, 434

(56) References Cited

U.S. PATENT DOCUMENTS

| | | | |
|---|---|---|---|
| 4,651,067 A | 3/1987 | Ito et al. ..................... 318/254 |
| 5,097,191 A | 3/1992 | Bahn ........................... 318/701 |
| 5,191,269 A | 3/1993 | Carbolante ................. 318/254 |
| 5,204,594 A | 4/1993 | Carobolante ................ 318/254 |
| 5,304,902 A | 4/1994 | Ueki ........................... 318/254 |
| 5,569,989 A | 10/1996 | Acquaviva ................... 318/254 |
| 5,614,797 A | 3/1997 | Carobolante ................ 318/432 |
| 5,859,510 A | 1/1999 | Dolan et al. ................ 318/254 |
| 5,866,998 A | * 2/1999 | Menegoli ..................... 318/254 |
| 5,869,946 A | 2/1999 | Carobolante ................ 318/811 |
| 5,920,166 A | 7/1999 | Schlager et al. ............ 318/439 |
| 6,020,699 A | * 2/2000 | Maggio et al. ............. 318/254 |
| 6,049,181 A | 4/2000 | Kolomeitsev ............... 318/254 |
| 6,249,099 B1 | 6/2001 | Nessi et al. ................. 318/439 |

FOREIGN PATENT DOCUMENTS

EP          0829951 A1    3/1998

* cited by examiner

Primary Examiner—Robert E. Nappi
Assistant Examiner—Rina I. Duda
(74) Attorney, Agent, or Firm—Lisa K. Jorgenson; Robert Iannucci; Seed IP Law Group PLLC

(57) ABSTRACT

A current control method controls current for drive systems of multi-phase brushless motors, in particular at phase switching, wherein the motor coils coupled to a common node are driven by applying a respective drive voltage to the free end of each coil via corresponding power stages. The method comprises switching the current flow from one phase to the next in the direction of rotation of the motor at the phase switch, thereby forcing the unaffected one of said coils by the phase switch into a state of high impedance. Advantageously, the decreasing rate of the current in the coil unaffected by the phase switch can be twice as high as the decreasing rate of the current in the phase being switched from.

13 Claims, 6 Drawing Sheets

CONTROL METHOD OF THE CURRENT FLOW IN DRIVER SYSTEMS FOR BRUSHLESS MOTORS, PARTICULARLY DURING THE SWITCHING PHASE

TECHNICAL FIELD

This invention relates to a method of controlling the flows of current in driving brushless motors with constant turn-off period Toff.

More particularly, the invention relates to a current control method for drive systems of multi-phase brushless motors, particularly at phase switching, wherein the motor coils led to a common node are driven each by applying a respective drive voltage to the free end of each coil via corresponding power stages.

The invention broadly concerns the driving of three- or multi-phase motors by the constant Toff current control methodology.

BACKGROUND OF THE INVENTION

A most frequently used methodology for driving three-phase motors or, more generally, multi-phase motors is known as the constant turn-off time Toff methodology.

FIG. 1 herein shows schematically the construction of a three-phase electric motor and its electronic driver circuit. Of course, this motor includes three coils 1, 2 and 3 which are Y-connected at a common node D. Half-bridge stages 4, 5 and 6 are connected to the opposite ends A, B and C, respectively, of each coil.

Each stage 4, 5 or 6 comprises a pair of DMOS power transistors Dm1, Dm2 which are driven from respective outputs of a corresponding driver circuit 13. Each transistor has an intrinsic diode associated therewith.

The half-bridge stages 4, 5 and 6 are usually connected together in parallel between a supply voltage reference Vs and a ground-connected sense resistor 7.

A comparator 8 has one input connected to the interconnection node between the resistor 7 and said stages 4, 5 and 6, and has the other input maintained at a reference potential Vref.

The output of the comparator 8 is connected to an input IN of an astable circuit 9. This astable circuit 9 is asked to generate a signal Toff corresponding to a predetermined turn-off time period. For the purpose, the astable circuit is connected to a parallel RC circuit comprising a resistor 10 and a capacitor 11.

The comparator 8 controls the current I=Vrf/Rsense which is flowing through the sense resistor 7 and, hence, through the motor coils. Decoding logic 12 is arranged to process information received on corresponding logic inputs and the signal received by the astable circuit 9. The logic 12 delivers a corresponding signal to each driver circuit 13 of the coils 1, 2 and 3 to control the motor rotation.

The aspects of the invention may be made clearer by an explanation of how a motor rotates under constant Toff control.

A half-bridge stage is regarded to be in the "off" state when the corresponding transistor Dm2 is "on" while the other transistor Dm1 is "off". This condition is illustrated schematically by FIG. 2, where current paths 14, 15 and 16 are shown to represent flows to be explained.

On the other hand, a half-bridge is regarded to be in the "on" state when the transistor Dm2 is "off" while the transistor Dm1 is "on".

When both transistors Dm1 and Dm2 are in the "off" state, the half-bridge is in a tristate mode.

The driver circuit 13 is able to control a current I1 in the branches 1-2 when this current I1 is flowing from the terminal A to the terminal B of the coils 1 and 2, while no current is flowing through the coil 3 (FIG. 3.1). On the contrary, the current I1 will flow through the branches 2-1 when the controlled current I1 is flowing from the terminal B to A with no current being present in the coil 3 (FIG. 3.4).

Assume the half-bridge 6 to be at a high impedance, half-bridge 5 to be "off", and half-bridge 4 "on". In this situation, a current I flowing through the coils 1-2 would have a time constant given as:

$$\tau = \frac{L1 + L2}{Rdm1 + Rdmn2 + Rl1 + Rl2}$$

where: L1, L2, Rl1 and Rl2 are inductance and parasitic resistance values, respectively for the coils 1 and 2, while Rdm1 and Rdm2 are the resistances of the "on" DMOS transistors in the half-bridges 4 and 5.

This current I causes the voltage across the resistor 7 to increase. Upon this voltage reaching the same value as the reference voltage Vref, the comparator 8 and astable circuit 9 will generate the constant time signal Toff.

Two different actions can be made during this phase. In particular, the current control is said to be in the fast decay mode if, during the period Toff, all the half-bridges are in the tristate mode and the inductive load current is looped back through the intrinsic diodes associated with the transistor Dm1 of the half-bridge 5 and the transistor Dm2 of the half-bridge 4 (path 14 in FIG. 2).

The current control is said to be in the slow decay mode if, during the period Toff, both half-bridges 4 and 5 are "on" while the half-bridge 6 is in the tristate mode. The decay time is here longer than in the former case, since the reverse voltage being applied to the coils 1 and 2 is lower.

After the time period Toff, the cycle sets out again from the start condition.

The peak current I1 flowing through the coils 1-2 is thus controlled. The same will occur as the currents in the branches 1-3 and 2-3 and the respective reverse directions 2-1, 3-1 and 3-2 are controlled.

The control logic 12 controls rotation by controlling the current in the order shown quite clearly in FIGS. 3.1, . . . ,3.6. For example, in the forward direction, the phase switching order is: 1-2; 1-3; 2-3; 2-1; 3-1; 3-2.

These figures show schematically the current flows that enable the rotation of a three-phase motor to be controlled in the forward and reverse directions. The rotational speed of the motor is equal to the rate of phase switching dictated by the control logic 12.

Let the case be considered of the current control being shifted from the branch 1-2 to the branch 1-3.

A single plot in FIG. 4A illustrates the patterns of different voltage and current signals present in the motor.

The moment that a change in phase is decided, the half-bridge 5 driving the coil 2 is forced into the tristate mode, allowing the regulated current I1 to loop back through the respective intrinsic diode of the transistor Dm1. Simultaneously therewith, the half-bridge 4 is held "on", and the half-bridge 6 enters the "off" state to increase the current in the coil 3. In this condition, considering the state of each half-bridge and the direction of the current at the time when the phase is changed, the following conditions apply to the voltages at the nodes A, B and C:

1) node A voltage:
   VA=Vcc−I*Ron, where RON is the turn-on resistance of the transistor Dm1 of the half-bridge 4, and Vcc is the supply voltage;
2) node B voltage:
   VB=Vcc+Vbe, where Vbe is the voltage at the intrinsic diode of the transistor Dm1 of the half-bridge 5;
3) node C voltage:
4) VC=0 because the current is nil at the start of the phase change in the coil 3.

Assuming, as the least favorable of cases, that the three coils can be considered as purely inductive loads, the Dmos resistance is negligible, and the supply voltage Vcc is so high that the drop across the intrinsic diode of the Dmos transistors can be ignored, then the voltages at the nodes A, B, C and D are given as:

VA=Vcc; VB=Vcc; VC=0; VD=⅔*Vcc.

FIG. 4 shows clearly that these values are attained at the end of the phase change.

Since the voltage at the coil 3 is twice higher than that on the coils 1 and 2, the rate of current increase in the inductor 3 will be twice as high as the rate of increase (or decrease) of the current in the coil 1 (or 2).

Accordingly, the state of the half-bridges 4, 5 will remain in this condition until the current in the half-bridge 6, and hence in the sense resistor 7, reaches the value of the regulated current I=Vref/Rsense.

As a result, upon the current 13 reaching the required value I in the branch 3, the current 12 in the branch 2 will reach a value 0.5*I and the current I1 in the branch 1 a value 1.5*I.

As shown in FIG. 4A, the current I1 in the branch 1 attains a higher value than the regulated current I. The phase switch forces the current I1 to increase in the branch 1, and therefore, a power loss is obtained by dissipation through the Dmos transistor Dm1 of the half-bridge 4 and the coil 1.

Furthermore, if the control current I is the largest acceptable current for the motor, half-bridge stages must be selected whose Dmos transistors can sustain currents which are 1.5 times larger than the maximum control current I provided, entailing increased consumption and manufacturing costs.

In addition, as the branch 1-2 begins to regulate the current I, the branch 3 decay takes place after a number of cycles of period Toff, and this in either the fast or the slow decay mode.

Also, where protection circuits for detecting the largest current being flowed through the Dmos transistors are provided, the protection circuits must be calibrated for a protection current which is at least 1.5 times the maximum control current I provided in the motor, which intensifies cost.

SUMMARY OF THE INVENTION

An embodiment of this invention provides a methodology for controlling the current flows during the drive phases of brushless-type electric motors, particularly upon phase switching, which is effective to overcome the aforementioned drawbacks of the prior art, ensure improved control of the current in the motor coils, and reduce power dissipation during such phase switching. The embodiment forces the current flow switched from one phase to the next phase according to the direction of rotation of the motor, by forcing the coil being turned off in the next phase into a state of high impedance during the phase switch.

The features and advantages of the method of this invention will become apparent from the following description of an embodiment thereof, given by way of non-limitative example with reference to the accompanying drawings.

DETAILED DESCRIPTION OF THE INVENTION

Figure 1:
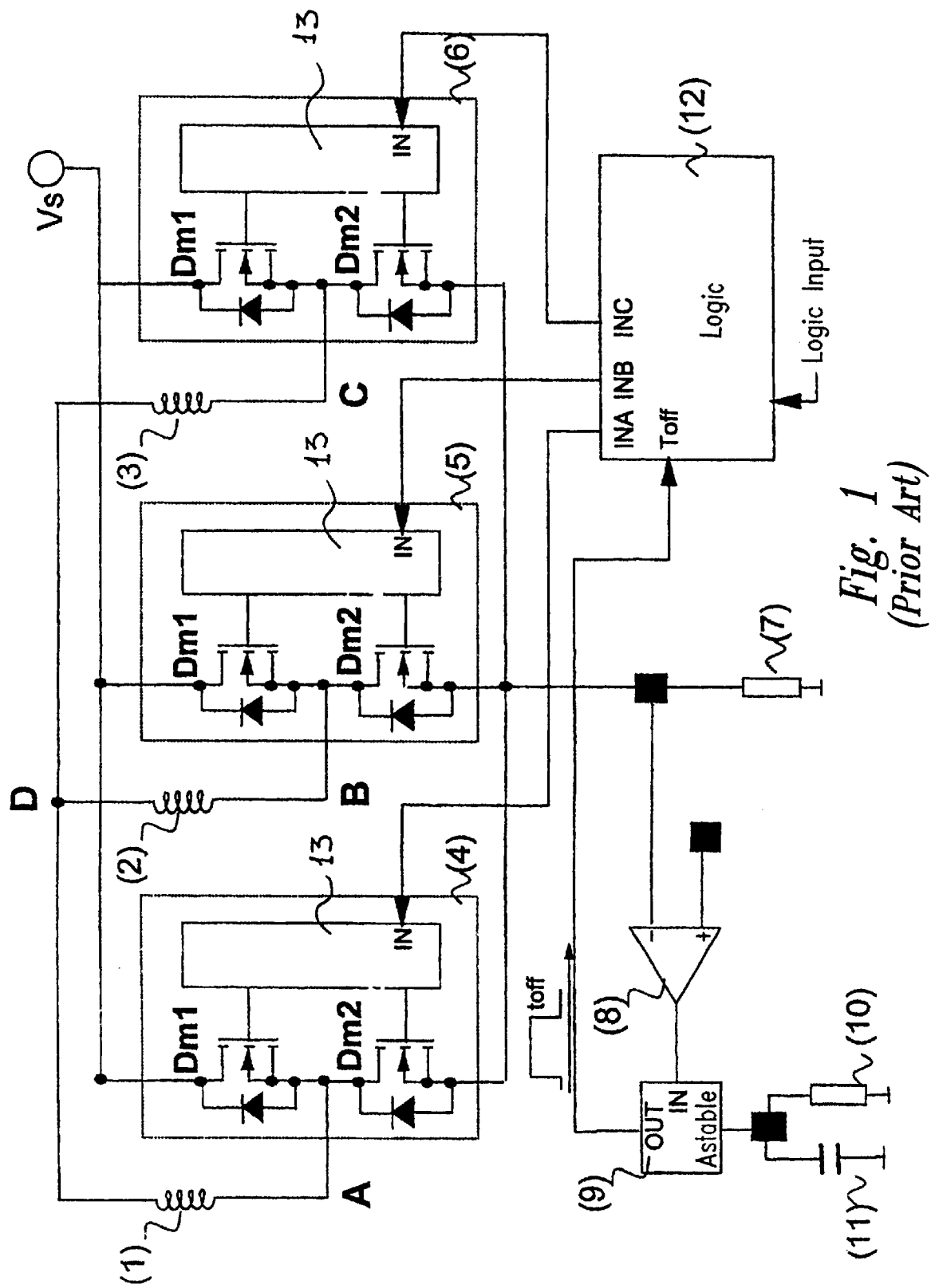
FIG. 1 shows schematically a three-phase electric motor and its control circuit, both according to the prior art.
Figure 5:
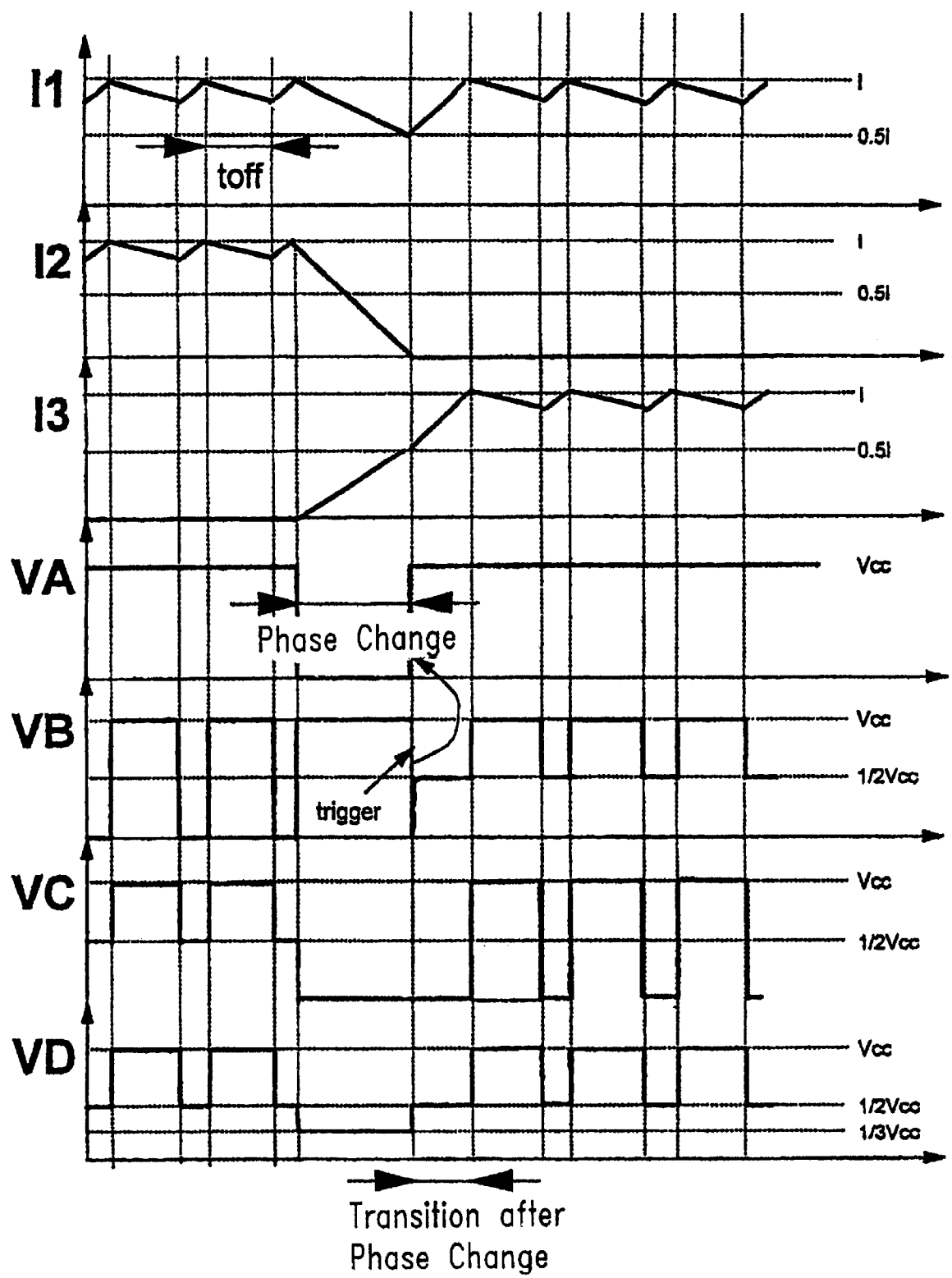
FIG. 5 shows schematically a single plot of several voltage and current signals present in a three-phase motor vs. time, the motor being driven in accordance with the method of this invention.

Referring to the drawing views, in particular to the example of FIG. 5, the driving methodology according to an embodiment of this invention applies to any three-phase or multi-phase motors like the one represented schematically in FIG. 1.

Figure 2:
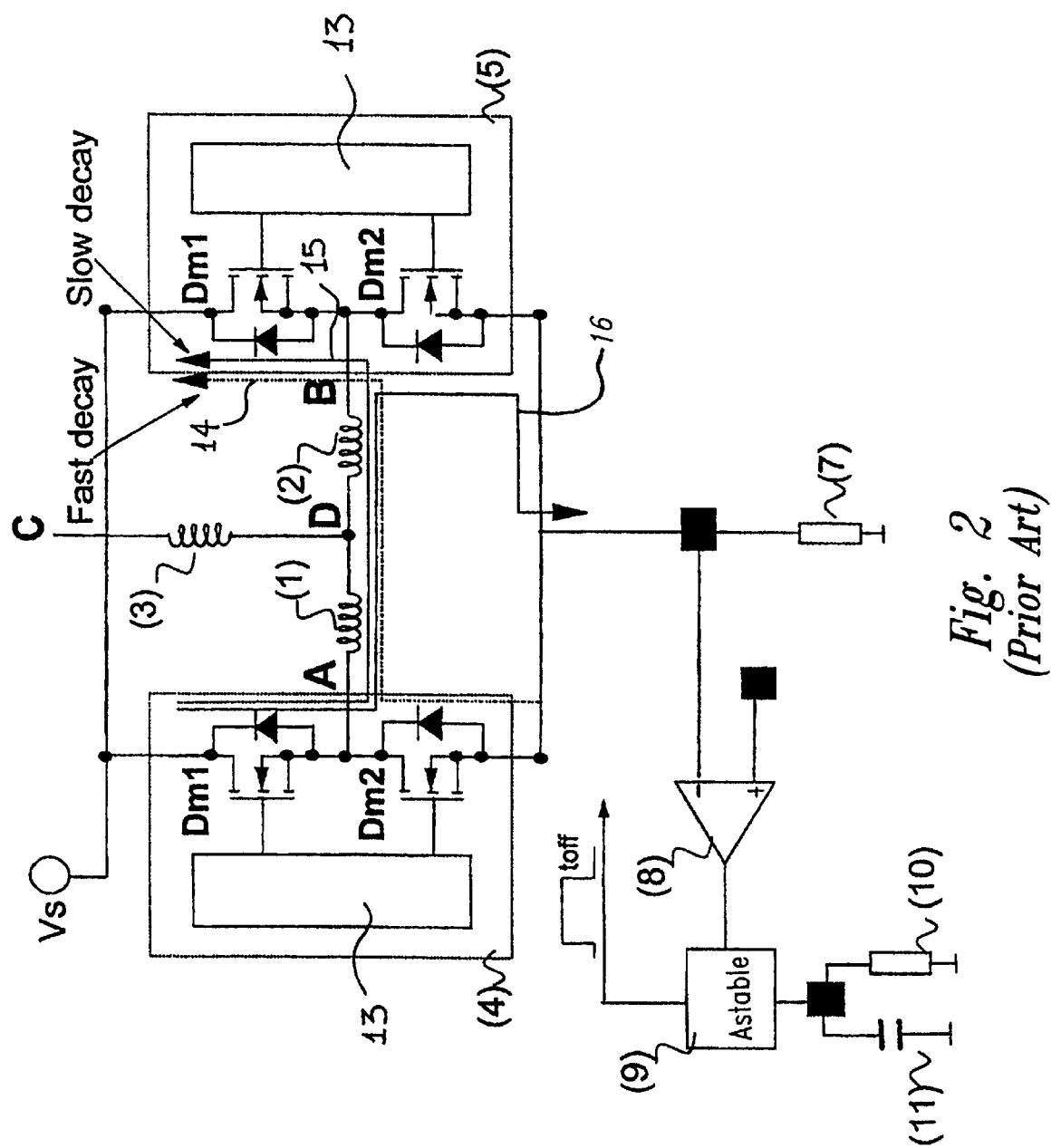
FIG. 2 shows schematically the coils of the motor in FIG. 1, and the motor control circuit, at a predetermined phase of the motor operation.
Figure 3:
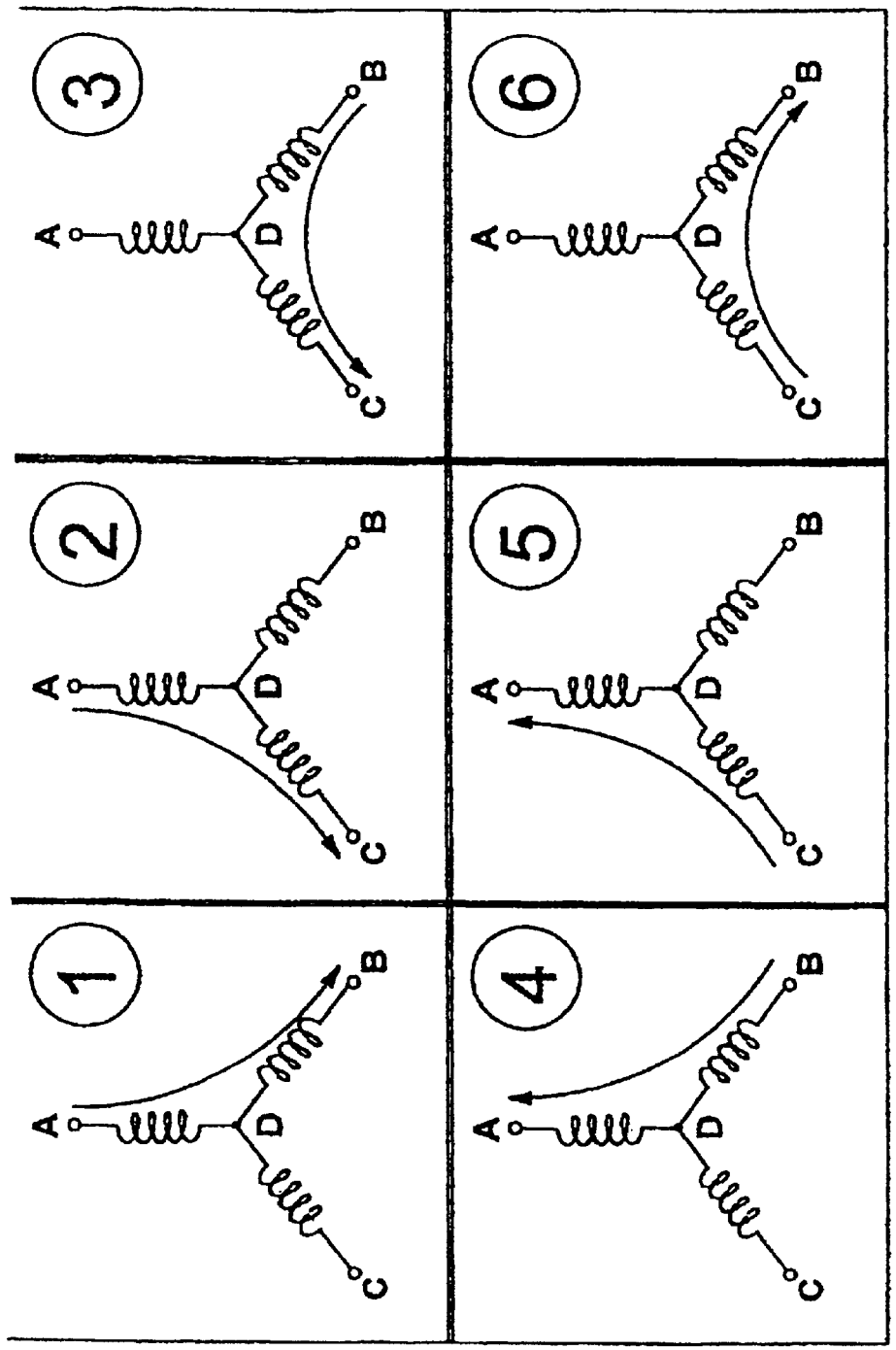
FIGS. 3.1, 3.2, 3.3, 3.4, 3.5, 3.6 are schematic views of the current flow through the coils of the motor in FIG. 1, during rotation of the latter.
Figure 4A:
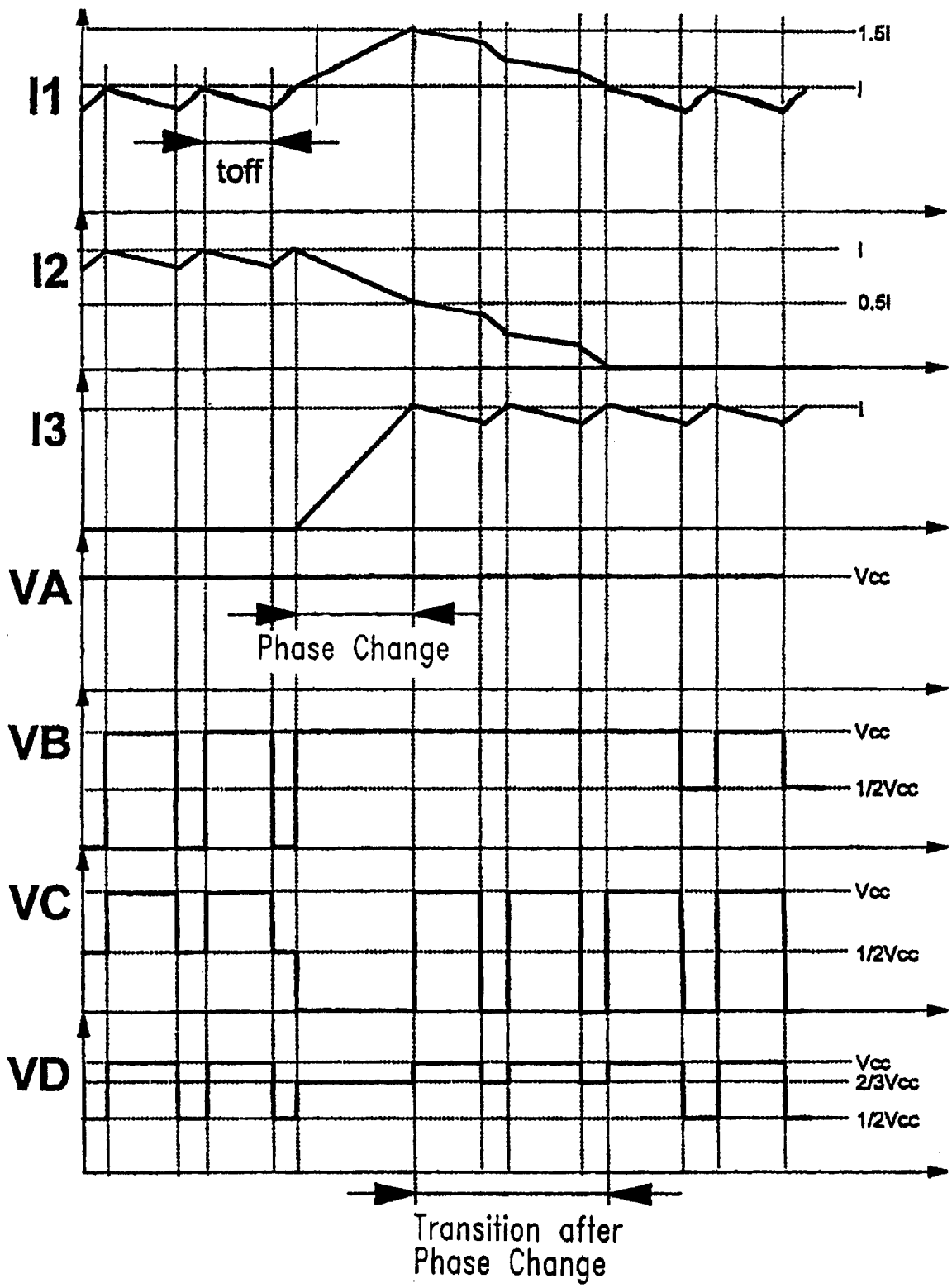
FIG. 4A shows schematically a single plot of several voltage and current signals in the coils of the motor in FIG. 1 vs. time.
Figure 4B:
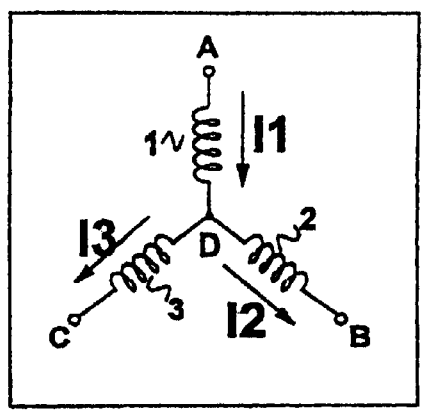
FIG. 4B shows schematically the coils of a three-phase motor and the currents flowing therethrough.
Figure 4C:
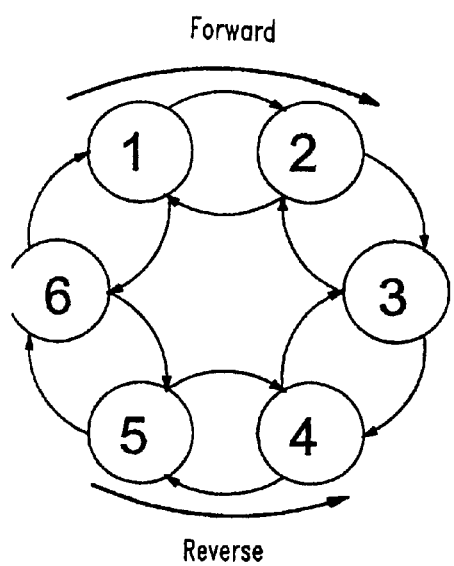
FIG. 4C shows schematically successive states corresponding to the operating conditions illustrated by FIGS. 3.1 to 3.6, for controlling the motor to rotate in the forward and reverse directions.

Consequently, to describe the drive as provided by this invention for a three-phase motor, specifically a brushless motor, reference will be made to the motor coils and the electronic components shown in FIGS. 1, 2, 4B and already described, for convenience of illustration.

More particularly, a procedure will be described which allows current overshooting, as occurring typically in the coils of multi-phase motors at phase switching, to be prevented. Such current overshots cause a loss of efficiency and a need to provide oversize MOS transistors for powering the motor coils.

With the method according to an embodiment of this invention, the regulated current of a given branch, e.g., the branch 1-2, can be passed to the next branch in the direction of rotation of the motor, e.g., the branch 1-3, without the current in the preceding branch 1 rising above the value of the regulated current I.

Concurrently therewith, the current I2 in the branch 2 is fast decayed.

For example, assuming the regulated current in the branch 1-2 to have the value of I, and that the phase has been decided to change in the branch 1-3. According to an embodiment of the invention, the branch 2 is forced to a state of high impedance and the branches 1, 3 are turned off.

This evolvement is best illustrated by the plot in FIG. 5.

Considering the state of each half-bridge and the current direction at the phase-changing time, the following voltage conditions at the nodes A, B and C prevail:

node A voltage: 0–I*Ron;

node B voltage: VB=Vcc+Vbe;

node C voltage: zero.

Within the same approximations as applied in the prior art, the voltages at the nodes A, B, C and D may be considered the following:

VA=0; VB=Vcc; VC=0; VD=⅓ *Vcc.

Since the voltage across the coil 2 is twice as high as those across the other coils, 1 and 3, it follows that the decreasing rate of the current I2 in the inductor 2 is twice as high as the increasing rate (or decrease) of the current in the coil 2 (or 1).

The half-bridge stages are held in this state until the current in the half-bridge 2 drops to zero.

As previously stated, when the current I2 in the branch 2 is zero, the current in the branches 1 and 3 attains the value 0.5*I.

At this point, the voltage will become zero at the node C of the branch where the current tends to be reversed through the loop-back diode.

Using this transition as a triggering signal, the half-bridge 3 is turned on to regulate the current in the branch 1-3.

The current in the branch 1-3 increases to the current control value I, and in the branch 2 the current remains zero.

Thus, the phase switch is obtained with no current overshooting and in a definitely faster way.

It should be noted that, although the foregoing description covers three-phase systems, the methodology of this invention can be applied to any phase switch in constant Toff period systems, and multi-phase systems alike.

The method of this invention does solve the technical problem of how to drive the coils in a multi-phase motor during its phase changes, and has several advantages as specified herein below:

1) improved control of the current in the branches;

2) less power dissipated during the phase switch;

3) choice of half-bridges having smaller DMOS transistors than in conventional systems, as regards maximum delivered current, and accordingly, lower overall cost of the system;

4) increased rate of phase-change current decay, and hence shorter duration of the transient before the current regulation through the coils provided by the rotational state; and 5) a protection current, selected by optional circuits used for detecting the largest current flowing through the DMOS transistors, can now be smaller than that used in conventional systems.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A current control method for a drive system of a multi-phase brushless motor at phase switching, the motor including first, second, and third motor coils coupled to a common node, the method comprising:

driving the first and second motor coils by applying a respective drive voltage to a free end of each of the first and second coils via corresponding power stages thereby producing a current flow through the first and second coils; and switching the current flow from the second coil to the third coil during a phase switch period by forcing the second coil into a state of high impedance during the phase switch period, wherein a value of current in the first coil during the phase switch period does not exceed a predetermined value of controlled current.

2. A method according to claim 1, wherein the value of said current in the first coil during the phase switch period is one half the value of said controlled current.

3. A method according to claim 1, wherein during the phase switch period the potential on said common node is a fraction of the supply potential equivalent to number of phases.

4. A method according to claim 1, wherein said motor is a three-phase motor.

5. A current control method for a drive system of a multi-phase brushless motor at phase switching, the motor including first, second, and third motor coils coupled to a common node, the method comprising:

driving the first and second motor coils by applying a respective drive voltage to a free end of each of the first and second coils via corresponding power stages thereby producing a current flow through the first and second coils; and switching the current flow from the second coil to the third coil during a phase switch period by forcing the second coil into a state of high impedance during the phase switch period, wherein a decreasing rate of current in the second coil is twice as high as a decreasing rate of current in the first coil during the phase switch period.

6. A current control method for a drive system of a multi-phase brushless motor at phase switching, the motor including first, second, and third motor coils coupled to a common node, the method comprising:

driving the first and second motor coils by applying a respective drive voltage to a free end of each of the first and second coils via corresponding power stages thereby producing a current flow through the first and second coils; and switching the current flow from the second coil to the third coil during a phase switch period by forcing the second coil into a state of high impedance during the phase switch period, wherein a decreasing rate of current in the second coil is twice as high as an increasing rate of current in the third coil during the phase switch period.

7. A current control method for a drive system of a multi-phase brushless motor at phase switching, the motor including first, second, and third motor coils coupled to a common node, the method comprising:

driving the first and second motor coils by applying a respective drive voltage to a free end of each of the first and second coils via corresponding power stages thereby producing a current flow through the first and second coils; and switching the current flow from the second coil to the third coil during a phase switch period by forcing the second coil into a state of high impedance during the phase switch period, wherein a zero voltage is applied to the free end of the first coil, as well as to a free end of the third coil during the phase switch period.

8. A current control method for a drive system of a multi-phase brushless motor at phase switching, the motor including first, second, and third motor coils coupled to a common node, the method comprising:

driving the first and second motor coils by applying a respective drive voltage to a free end of each of the first and second coils via corresponding power stages thereby producing a current flow through the first and second coils; and switching the current flow from the second coil to the third coil during a phase switch period by forcing the second coil into a state of high impedance during the phase switch period, wherein said motor is a three-phase motor and during the phase switch period, the potential at said common node is one third of a supply potential from which the coils are driven.

9. A method of driving a three-phase motor having first, second, and third coils, comprising:

applying a first voltage reference to the first coil and a second voltage reference to the second coil while leaving the third coil in a tristate mode during a first driving phase;

applying the first voltage reference to the first coil and the second voltage reference to the third coil while leaving the second coil in the tristate mode during a second driving phase;

applying the second voltage reference to the first and third coils and leaving the second coil in the tristate mode during a transition phase that immediately follows the first driving phase and immediately precedes the second driving phase.

10. The method of claim 9, further comprising applying the second voltage reference to the first coil during the first driving phase such that the first coil is alternately applied the first and second voltage references during the first driving phase.

11. The method of claim 9, further comprising applying the first voltage reference to the second coil during the first driving phase such that the second coil is alternately applied the first and second voltage references during the first driving phase.

12. The method of claim 9 wherein the second voltage reference is applied to the first and third coils and the second coil is left in the tristate mode during the entire transition phase.

13. A method of driving a three-phase motor having first, second, and third coils, comprising:

applying a first voltage reference to the first coil and a second voltage reference to the second coil while leaving the third coil in a tristate mode during a first driving phase;

applying the first voltage reference to the first coil and the second voltage reference to the third coil while leaving the second coil in the tristate mode during a second driving phase;

applying the second voltage reference to the first and third coils during a transition phase that immediately follows the first driving phase and immediately precedes the second driving phase, the second voltage reference being applied constantly to the first and third coils during the entire transition phase.

* * * * *